April 19, 1960  J. P. RUTH  2,933,368
METHOD OF TREATING EXHAUST GASES OF INTERNAL COMBUSTION ENGINES
Filed Aug. 6, 1956  2 Sheets-Sheet 1

Fig. I

INVENTOR.
Joseph P. Ruth.
BY
ATTORNEY.

April 19, 1960 J. P. RUTH 2,933,368
METHOD OF TREATING EXHAUST GASES OF INTERNAL COMBUSTION ENGINES
Filed Aug. 6, 1956 2 Sheets-Sheet 2

INVENTOR.
Joseph P. Ruth.
BY
ATTORNEY.

United States Patent Office 2,933,368
Patented Apr. 19, 1960

2,933,368
METHOD OF TREATING EXHAUST GASES OF INTERNAL COMBUSTION ENGINES

Joseph P. Ruth, Denver, Colo.

Application August 6, 1956, Serial No. 602,223

1 Claim. (Cl. 23—2)

This invention relates to the treatment of gases and vapors, such as internal combustion engine exhaust gases, vapors eventuating from chemical and industrial procession operations, and the like, for the suppression of acidic characteristics thereof, for the elimination of noxious and irritant properties therefrom, for the recovery of value constituents, and for other purposes attainable through intimate gas-liquid contact and diffusion of the resulting gas-liquid mixtures through an appropriate medium, and has as an object to provide novel and improved apparatus operable to treat and to modify such gases with efficiency and economy.

A further object of the invention is to provide novel and improved apparatus for the treatment of gases and vapors which is promotive of vapor transit therethrough with minimum resistance.

A further object of the invention is to provide novel and improved apparatus for the treatment of gases and vapors that is adaptable for continuous efficient operation with but infrequent occasion for servicing or maintenance attention.

A further object of the invention is to provide novel and improved apparatus for the treatment of gases and vapors that is conservative in operation of liquid utilized for the development of gas-liquid mixtures.

A further object of the invention is to provide novel and improved apparatus for the treatment of gases and vapors that is applicable in multiple organization to the progressive conditioning of a particular gas or vapor.

A further object of the invention is to provide novel and improved apparatus for the treatment of gases and vapors that is highly adaptable to effect desired conditioning and modification of a particular gas or vapor.

A further object of the invention is to provide a novel and improved construction and organization of elements constituting apparatus for the treatment of gases and vapors.

A further object of the invention is to provide novel and improved apparatus applicable to the treatment of internal combustion engine exhaust gases for effective neutralization of the acidic properties thereof.

A further object of the invention is to provide novel and improved apparatus effective for the practice of a conditioning method applicable to the treatment of internal combustion engine exhaust gases for the neutralization of acidic characteristics thereof.

A further object of the invention is to provide a novel and improved method applicable to neutralize the acidic characteristics of internal combustion engine exhaust gases.

A further object of the invention is to provide a novel and improved method for promoting the ameliorating effect of limestone on internal combustion engine exhaust gases, and water admixtures thereof, diffused therethrough.

A further object of the invention is to provide a novel and improved gas- or vapor-conditioning unit that is relatively simple and inexpensive of production and installation, susceptible of development in an extensive range of sizes and capacities, adaptable to meet the specific requirements of diverse situations, and positive and efficient in attainment of the ends for which designed.

With the foregoing and other objects in view, my invention consists in the nature and sequential relation of method steps and in the construction, arrangement, and operative combination of elements as hereinafter set forth, pointed out in my claim, and illustrated by the accompanying drawings, in which—

Figure 1:
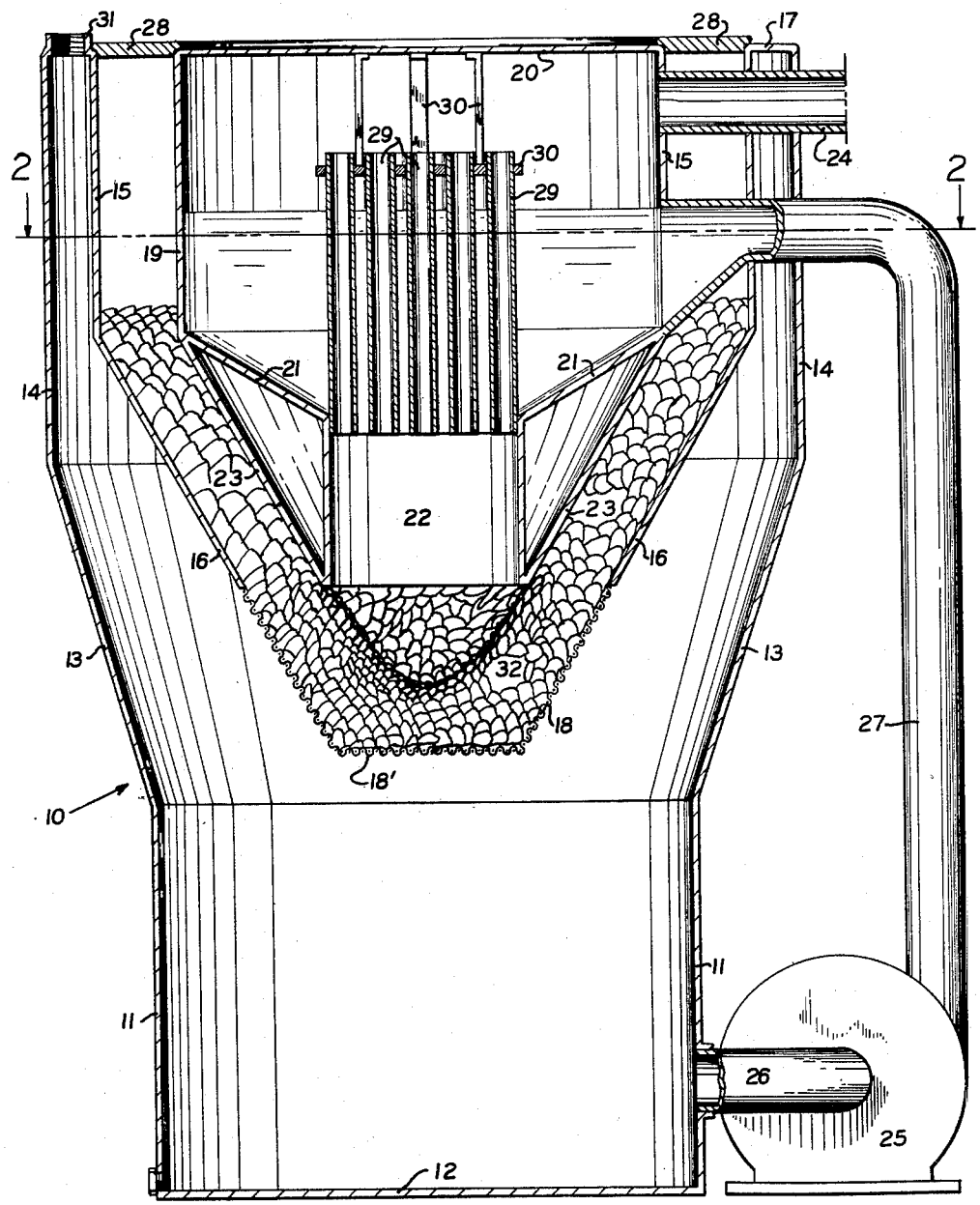
Figure 1 is a vertical section substantially axially through a typical unit embodying the principles of the invention as organized and arranged for practical use.
Figure 2:
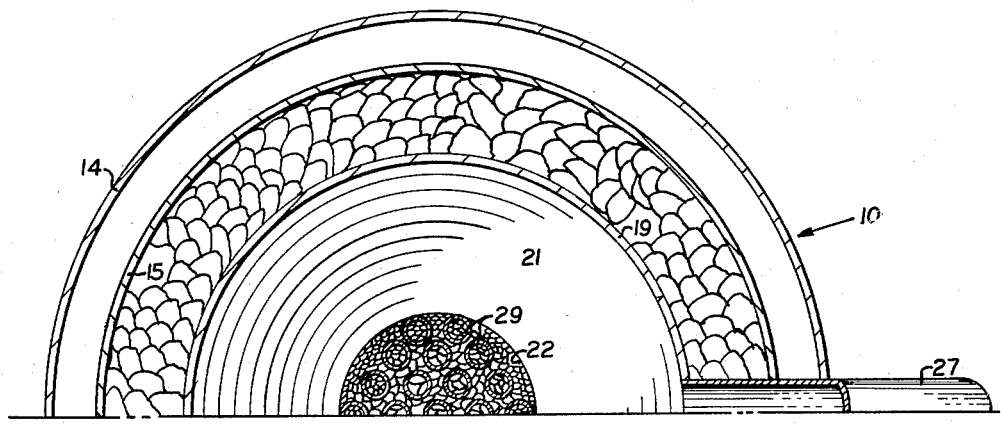
Figure 2 is a half-sectional view transversely of the organization according to Figure 1, taken substantially on the indicated line 2—2 of Figure 1.

It is well established that many gases and vapors may be advantageously processed for the realization of various particular purposes through the correlated steps of bringing the gas or vapor into intimate contact with a liquid in a manner to generate a gas-liquid mixture, diffusing the gas-liquid mixture, and entrained liquid, through an intersticed medium appropriate to effect desired modification of the properties characterizing the gas-liquid mixture, scrubbing and washing the gases and gas-liquid mixtures while in transit through the diffusing medium, and recovering for reuse liquid entrained with the gases and mixtures as the latter pass from the diffusing medium to release for further processing, and the instant invention is directed to the provision of novel and improved apparatus operable to accomplish the procedures above set forth with enhanced efficiency and high economy.

The improved apparatus of the invention is a unitary assembly adapted for use either singly, or in multiple, as may be expedient in the treatment of particular gases or vapors, whereof the constituent elements are operatively correlated in and with a preferably cylindrical, axially-upright tank or housing 10 of desired capacity characterized by a cylindrical, open-top base portion 11, imperforate save as hereinafter specified, provided with a bottom end closure 12 and adapted to contain liquid, an inverted frusto-conical intermediate portion 13 coaxial with the base portion 11 diverging upwardly and outwardly from and as an integral imperforate extension of the latter, and a cylindrical top portion 14 coaxially uprising as an integral extension from the margin of the upper, greater base of the portion 13. An open-top receiver is formed as a cylindrical shell 15 merging into an inverted, frusto-conical skirt 16 sloped to diverge inwardly and away from the tank intermediate portion 13 when the two are concentric, and the shell 15 of said receiver is sized to telescope freely and with considerable clearance within the tank upper portion 14 wherein it coaxially and fixedly depends from engagement of its upper end margin with the inner margin of an annular flange 17 extending radially and inwardly from the upper end margin of the tank portion 14 to overlie and close the space between said shell and tank portion. The shell 15 has an axial dimension less than that of the tank portion 14, whereby to dispose the junction of said shell with its skirt 16 somewhat above the junction of the tank portions 13 and 14 when the shell is mounted as shown and described, and the said skirt 16 terminates in an open lower end disposed preferably above the mid-height of the tank portion 13. Extending downwardly from and obstructing the otherwise open lower end of the skirt 16, a basket 18 of reticulate or foraminous material continues the frusto-conical conformation of said skirt to terminate in a flat end web 18' parallel to the tank bottom closure 12 spaced slightly above the plane marking the junction between the tank portions 11 and 13. Spaced inwardly from, concentrically with, and interiorly of the shell 15, a cylindrical chamber 19 formed with a top closure 20 is supported in any appropriate manner to depend from coplanar relation of its top closure 20 with the flange 17 in an axial dimension approximating that of said shell, and a frusto-conical floor 21 inclined inwardly and downwardly of said chamber to a central aperture serves a tubular throat 22 registered with, terminating spacedly above, and of substantially the same diametric size as the web 18', said throat 22 expediently being disposed with its open lower end at about the plane marking the junction of the skirt 16 with the basket 18. The floor 21 of the chamber 19 is sloped to diverge inwardly away from the adjacent skirt 16 and a frusto-conical baffle 23 closes between the major diameter base of said chamber and the lower end of the throat 22 parallel to said skirt to define a smooth-walled annular passage of uniform open width between said baffle and the adjacent skirt.

Completing the structural organization of the apparatus, an input line 24 for the introduction of the gas or vapor to be treated is sealed through the wall of the upper tank portion 14, the shell 15, and a wall of the chamber 19 to deliver within the upper portion of said chamber, a pump 25 is arranged with its intake 26 connected through and for supply from the tank lower portion 11 and its output line 27 sealed through the tank upper portion 14, shell 15, and chamber 19 for delivery interiorly of the latter and above the floor 21 thereof, a removable cover 28, or the equivalent, is provided to close the annular open space between the shell 15 and chamber 19 at the coplanar upper ends thereof, and a battery of like flow tubes 29 disposed in closely-spaced, parallel relation is suspended by any suitable means, represented at 30, centrally and interiorly of the chamber 19 with the axes of said tubes vertical, upper ends of said tubes well above the input level from the line 27, and the lower ends of said tubes received in a maintained spacing from one another within the upper end of the throat 22.

With a vent 31 through the flange 17 to atmosphere, or for connection to a line leading to subsequent processing operations, the tank lower portion 11 charged with suitable liquid to about the level of the junction of the tank portions 11 and 13, the receiver charged with appropriate diffusing material 32 through the space normally closed by the cover 28 in an amount to fill the basket 18 and the open area between the shell 15 and chamber 19 and between the skirt 16 and baffle 23, the gas or vapor to be treated supplied to the chamber 19 through the line 24, and the pump 25 operating, the apparatus functions to treat and condition the gas or vapor in a novel and efficient manner. The pump 25 delivers liquid from the tank lower portion 11 as a charge of considerable head within the lower portion of the chamber 19 whence the liquid escapes between and about the tubes 29 and through the throat 22 under the influence of gravity to induce, in reaction to suction effect developed at the lower ends of said tubes, high velocity flow of gas or vapor from the upper portion of said chamber through said tubes for consequent intimate contact and admixture of the liquid with the gas or vapor and rapid and thorough generation of gas-liquid mixtures. From the throat 22, the gas-liquid mixtures and excess liquid pass through the diffusing material 32 filling the basket 18, where further intimate contact of liquid and gas is had, the gases and mixtures are thoroughly scrubbed, and any intended reaction between the gases and gas-liquid mixtures and diffusing material is accomplished. Liquid washed through the basket 18 and its contents returns to the charge within the tank lower portion 11 for recirculation by the pump 25 after deposit of any entrained sediment on the floor of the tank and the buoyant gases and vapors washed, scrubbed, and possibly reacted through the charge 32 escape from the basket 18 above the liquid charge therebelow for uprise interiorly of the tank portions 13 and 14 and exteriorly about the skirt 16 and shell 15 to the vent 31 whence they leave the apparatus, the initially wide and upwardly tapering conformation of the area provided for such gas or vapor uprise facilitating release of liquid entrained therewith and return of the liquid to the tank charge, thus to conserve liquid and to effectively separate the treated vapors from entrained material. As should be apparent, the apparatus shown and described operates to circulate and recirculate a given charge of liquid in a proportion large with respect to the gas or vapor input for very effective washing and conditioning thereof, which circulation and recirculation and the suction effect applied to the gas or vapor input thereby preclude the generation of back pressures otherwise requisite to entrain the mixtures through the diffusing material and conduce to a delivery of gas or vapor to the apparatus under the normal output pressures thereof without occasion for stimulation of such flow.

Utilizing water as the liquid charge for the tank portion 11 and broken limestone to constitute the diffusing material 32, the apparatus is applicable to the conditioning of internal combustion engine exhaust gases input to the chamber 19 through the line 24 under the sole influence of their discharge pressures. Entrained at high velocity through the tubes 29 in reaction to the suction effect developed at the lower ends of said tubes by the downward flow of water thereabout, the gases delivered to the upper portion of the chamber 19 are thoroughly wetted by and mixed with the water descending through the throat 22 and therewith are washed over and through the alkaline charge 32 which acts to neutralize the acid characteristic of the so-wetted gases as the flow repetitiously contacts the freshly washed and wetted surfaces of the limestone fragments, thus cooling, cleansing, and modifying such gases for release to atmosphere relieved of their noxious and irritant properties. Since the apparatus operates with high conservation of the water charge and the very slow depletion of the limestone reacted with the gas-liquid mixtures in the basket 18 is compensated by gravity feed of fresh material to the basket from the supply within the receiver and about the chamber, the apparatus is adapted to function efficiently for long periods of time without servicing or other attention.

Repetitious washing of internal combustion engine exhaust gases, and gas-water mixtures, through intersticed limestone in the manner and by means of the apparatus above described is effective to substantially neutralize the acid characteristic of the wetted gases and to develop a consequent persistent acidic quality in the recirculated solution which somewhat retards the efficacy of the ameliorating operations to a degree beyond the corrective capacity of the limestone alone. It has been determined that the pH of the recirculated solution may be materially elevated for moderation of the acidic quality thereof and improvement in the effectiveness of the described method through the addition to the limestone charge 32, or to the solution circulated therethrough, of supplements coactive with said charge and with each other to enhance neutralization of the acid characteristic of the wetted gases and gas-water mixtures, and a feature of the invention is the novel method distinguished by the use of certain such supplements applicable through the improved apparatus above described to promote and to stimulate desired conditioning of internal engine exhaust gases. It has been established that a combination of sodium sulfite ($Na_2SO_3$) and hydroquinol ($C_6H_6O_2$) present in appropriate proportions readily enters into solution with the recirculated water and persists therein through repetitious circulation therewith through the limestone charge to augment the neutralizing effect of the latter and to reduce the intensity of the acid quality otherwise developed within the solution as applied to the treatment of exhaust gases, thus materially elevating the pH of the operating solution. While neither sodium sulfite or hydroquinol, alone, will adequately persist in the solution or effect the desired results, it is found that a combination of one part of hydroquinol with approximately ten parts of sodium sulfite added in the proportion of approximately one part of the combination to one hundred parts of water is effective in coaction with the limestone charge 32 through extended time periods to enhance the acid neutralizing capacity of the apparatus as applied to the treatment of exhaust gases and to materially reduce the intensity of the acid quality otherwise characterizing the solution so used.

Figure 3:
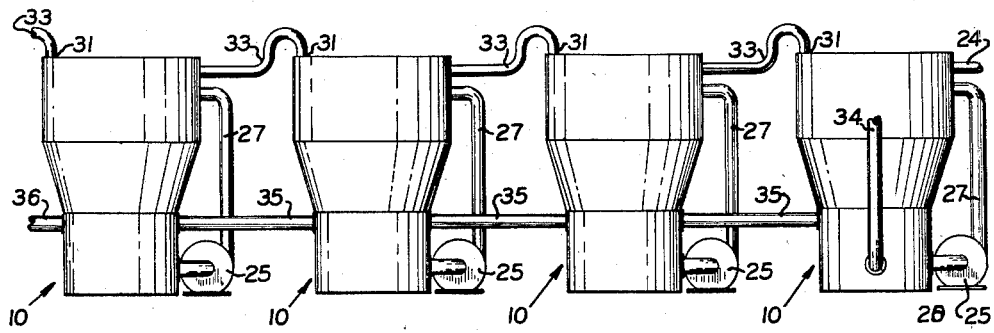
Figure 3 is a diagrammatic representation of multiple arrangements for the progressive treatment of gases and vapors to which the improvements according to the preceding views are applicable.

As typified by Figure 3, the apparatus unit above described is suited for use in multiple arrangements applicable to the progressive treatment of gases and vapors. A plurality of the tanks 10, each equipped with its pump 25 and interior elements in the arrangement and operative organization hereinabove set forth, may be very simply intercorrelated to either repetitiously subject the gas or vapor flow to a progressive series of like treatments or to pass such flow through a progressive series of unlike treatments. When it is desired that the gas or vapor flow be processed through a succession of unlike treatments, an apparatus unit typified by the tank 10 is provided for each such separate treatment and the several such tanks are individually charged with liquid and diffusing material appropriate to effect the specific treatment contempltaed, whereafter the vent 31 of the tank 10 first in the desired succession of treatments is connected by a line 33 to the input 24 of the tank 10 next in such succession, the vent 31 of the second tank 10 is similarly connected by a line 33 to the input 24 of the third tank, and such routing of the gas flow from tank to tank is continued through the series to ultimate release of the treated gas or vapor from the vent 31 of the tank last in the battery. Naturally, repetitious identical treatments of the gas or vapor flow may be had through the battery of tank units intercoupled as above described when the liquid and diffusing material charges of the several tanks are the same. However, in the processing of certain gases and vapors it is not only expedient to subject the gas or vapor flow to a succession of identical treatments but also to maintain a circulation of the liquid utilized from a source or supply of fresh liquid and entirely through the battery of tanks 10 utilized in the given processing operation, which requirement is readily met by adding to the battery intercoupled by the lines 33 as above set forth a liquid supply line 34 serving the lower portion 11 of the tank first in the series and by supplying flow lines 35 interconnecting the lower portions 11 of the successive tanks and an outlet 36 from the portion 11 of the tank last in the series. Organized as shown in Figure 3, the tank battery is characterized by a flow of gas or vapor successively through and subject to treatment in each of the tank units and by a continuous feed of liquid through and between the portions 11 of the successive tanks, while, with a suitable proportioning of liquid input to the rate of pump operation, at each tank unit the liquid is circulated and recirculated therein and for treatment of the gas or vapor infed thereto at a rate exceeding in any desired multiple the transfer of the liquid from tank to tank.

Since changes, variations, and modifications in the form, construction, and particular arrangement of the elements shown and described may be had without departing from the spirit of my invention, I wish to be understood as being limited solely by the scope of the appended claim, rather than by any details of the illustrative showing and foregoing description.

I claim as my invention:

The method of treating internal combustion engine exhaust gases which consists of repetitiously circulating water in a closed circuit to and for gravity-induced passage through an intersticed body of limestone transverse of the circuit, directing the circulating water about and downwardly along lower portions of flow tubes terminating in open ends superjacent the limestone body for consequent generation of suction effect acting through said tubes, introducing the gases to be treated to said circuit and the upper ends of the flow tubes therein above the circulating water in exposure to the influence of such suction effect through the tubes for consequent intimate admixture with the water as an incident of water circulation, entraining the gases and gas-water mixtures in intimate surface contact with and through the consequently washed and wetted limestone, and separating entrained gases from the water by virtue of their inherent buoyancy immediately subsequent to their traverse of the limestone.

References Cited in the file of this patent

UNITED STATES PATENTS

| | | |
|---|---|---|
| 1,864,037 | Atkins | June 21, 1932 |
| 2,163,169 | Gollmar | June 20, 1939 |
| 2,611,680 | Ruth | Sept. 23, 1952 |
| 2,754,182 | Ruth | July 10, 1956 |
| 2,773,735 | Ruth | Dec. 11, 1956 |
| 2,776,873 | Ruth | Jan. 8, 1957 |